United States Patent [19]

Ohga et al.

[11] Patent Number: 4,949,831

[45] Date of Patent: Aug. 21, 1990

[54] DAMPING MECHANISM OF CLUTCH DISC

[75] Inventors: Syogo Ohga, Osaka; Toshiyuki Imai, Higashiosaka, both of Japan

[73] Assignee: Kabushiki Kaisha Daikin Seisakusho, Neyagawa, Japan

[21] Appl. No.: 330,019

[22] Filed: Mar. 29, 1989

Related U.S. Application Data

[63] Continuation-in-part of Ser. No. 150,423, Jan. 25, 1988, abandoned, and Ser. No. 183,039, Mar. 4, 1988, abandoned.

[30] Foreign Application Priority Data

| May 26, 1986 | [JP] | Japan | 61-120798 |
| May 26, 1986 | [JP] | Japan | 61-79332 |
| Sep. 29, 1986 | [JP] | Japan | 61-149053 |
| Oct. 9, 1986 | [JP] | Japan | 61-155103 |
| May 20, 1987 | [WO] | PCT Int'l Appl. | PCT/JP87/00323 |
| Sep. 10, 1987 | [WO] | PCT Int'l Appl. | PCT/JP87/00672 |

[51] Int. Cl.$^5$ .......................................... F16D 13/60
[52] U.S. Cl. .............................. 192/107 C; 192/30 V
[58] Field of Search .............. 192/107 C, 107 R, 30 V

[56] References Cited

U.S. PATENT DOCUMENTS

| 2,124,734 | 7/1938 | Fies | 192/107 C |
| 2,182,999 | 11/1939 | Wolfram | 192/107 C |
| 2,217,529 | 10/1940 | Spase | 192/107 C |
| 2,222,507 | 11/1940 | Hunt | 192/107 C |

FOREIGN PATENT DOCUMENTS

59-11046  3/1984  Japan ............................ 192/107 C

Primary Examiner—Dwight Diehl
Assistant Examiner—Andrea Pitts
Attorney, Agent, or Firm—Armstrong, Nikaido, Marmelstein, Kubovcik & Murray

[57] ABSTRACT

A damping mechanism for clutch disc for use in an automobile clutch, including an axially compressible cushioning plate supporting a facing in between a flywheel and a pressure plate. In order for minimizing "resonance sound" of the cushioning plate due to axial vibration, a damping member for controlling the axial vibration of the cushioning plate is installed between the cushioning plate and the clutch plate.

11 Claims, 7 Drawing Sheets

DAMPING MECHANISM OF CLUTCH DISC

TECHNICAL FIELD

The application is a continuation-in-part of U.S. patent application Ser. No. 150,423, filed Jan. 25, 1988 and U.S. patent application Ser. No. 183,039, filed Mar. 4 1988, both abandoned and relates to a damping mechanism for a clutch disc suitable mainly for an automobile clutch.

BACKGROUND ART

Generally, a clutch disc is so constructed that a friction facing, secured to a cushioning plate provided at an outer periphery of the clutch disc, is disposed between an engine-side flywheel and a pressure plate interlocked to a clutch pedal. Further, it is so constructed that torque, from the flywheel side, is transmitted through the clutch disc to a central output shaft when the friction facing is sandwiched by and between the flywheel and the pressure plate.

The engine-side torque is transmitted to the clutch, but on the other hand, various vibrations of the engine-side are also transmitted thereto. These vibrations are simultaneously transmitted to the pressure plate through the friction facing, etc. Such vibration cause resonance of the cushioning plate or pressure plate so that a resonance sound is apt to be emitted therefrom in a half-engaged state of the clutch at the time of starting the vehicle.

An object of this invention is to solve the problem of "resonance sound" emitted especially in the so-called half-engaged state during engaging the clutch due to resonance of the cushioning plate or pressure plate.

DISCLOSURE OF THE INVENTION

In a clutch disc, including a first part flush with a fastening portion to the clutch plate, or deviating to a flywheel side, and a second part proturberating from the first part to a pressure plate side, both being provided on a cushioning plate interconnecting an output-side disc-like clutch plate with its outer peripheral side input facing, and a friction facing secured to the flywheel side of the first part and the pressure plate side of the second part; a damping mechanism for the clutch disc having a damping member for damping vibrations in an axial direction of the cushioning plate installed between the cushioning plate and the clutch plate.

Torque inputted from the engine-side flywheel to the friction facing is transmitted through the cushioning plate to the output-side clutch plate. On the other hand, axial vibrations generated from various resources are also transmitted from the flywheel side to the friction facing. These vibrations are transmitted to the cushioning plate. However, resonance of the cushioning plate is damped by the damping member so that generation of so-called "resonance sound", emitted during a half-engaged state, can be controlled.

DESCRIPTION OF THE INVENTION

The invention will be described in details hereunder with reference to the attached drawings.

Figure 1:
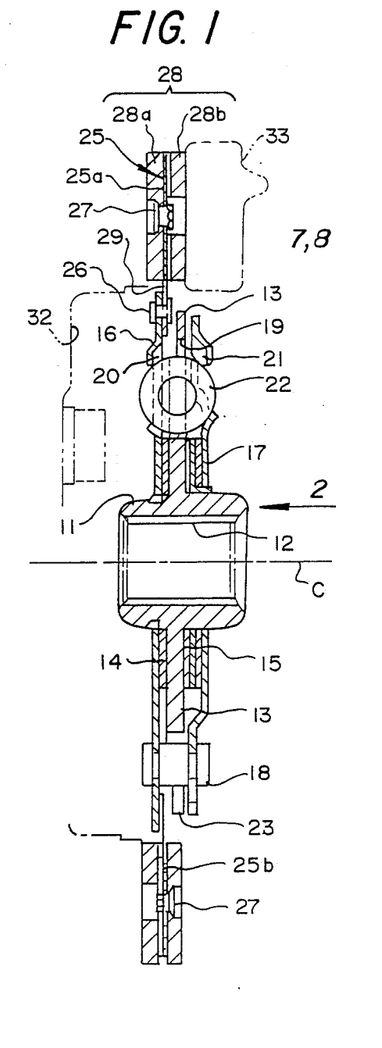
FIG. 1 is a vertical sectional view of a clutch disc employing a damping mechanism according to the invention.

In FIG. 1 a spline hub 11 includes on its inner peripheral surface a spline 12 fitting onto an output shaft (not shown) and has integrally on its outer periphery, a disc-like flange 13. Annular friction members 14 and 15 are disposed on opposite sides of inner peripheral portions of the flange 13 and a disc-like clutch plate 16 and a retaining plate 17 are disposed on opposite sides of the flange 13 in such a manner as sandwiching the friction members 14 and 15.

Plural window holes 19, 20 and 21 (each one being shown) are provided near the outer peripheries of the flange 13 and the plates with intervals left therebetween in a circumferential direction of the clutch.

A torsion spring 22 is fitted in each set of window holes 19, 20 and 21 in such manner as to extend in the circumferential direction of the clutch. Further, outer peripheral portions of the clutch plate 16 and the retaining plate 17 are integrally connected together by a stop pin 18 parallel to the clutch center axis. The stop pin 18 is engaged with a notch 23 formed at an outer peripheral part of the flange 13 with play left therebetween in the circumferential direction of the clutch.

An inner peripheral fastening part 29 of a cushioning plate 25 is secured by a rivet 26 to a flange 13 side face of a outer peripheral part of the clutch plate 16.

Figure 2:
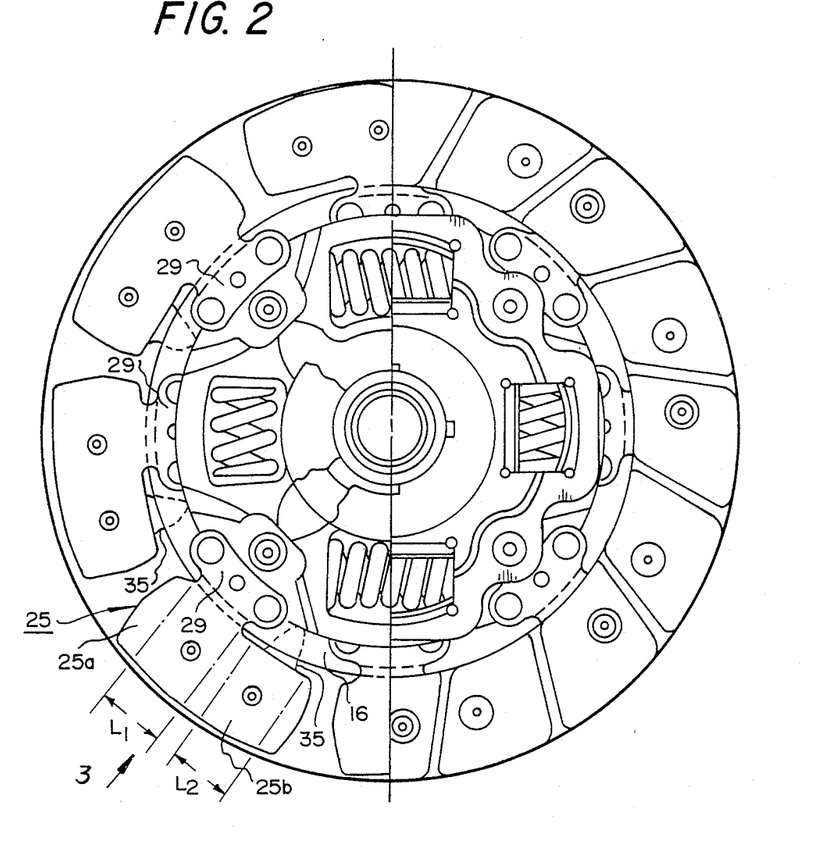
FIG. 2 is a partially fragmental front view viewed in a direction of arrow II of FIG. 1.

A plurality of the cushioning plates 25, FIG. 2, are disposed on the clutch plate with equal intervals left therebetween.

Each of the cushioning plates 25 has a first part 25a (this part can be deviated to a flywheel 32 side) extending on a plane approximately flush with the clutch plate 16 and a second part 25b proturberating from the first part 25a to the pressure plate 33 side, FIG. 1. A facing 28a is fastened by a rivet 27 to a flywheel 32 side of the first part 25a, and a facing 28b is fastened by the rivet 27 to a pressure plate 33 side of the second part 25b in the same way.

Because the cushioning plate 25 has the first part 25a and the second part 25b formed into an approximately wavy shape, the cushioning plate 25 can provide a spring action when both sides facings 28a and 28b are compressed toward each other.

Figure 3:
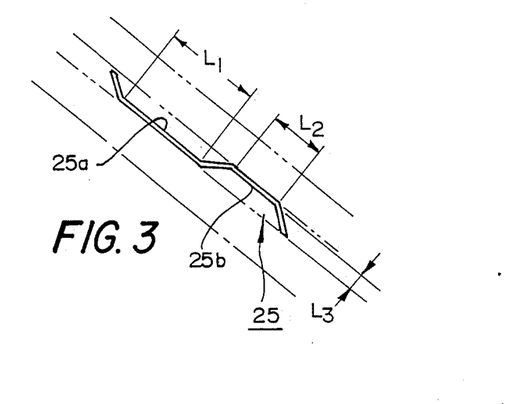
FIG. 3 is a schematic view viewed in a direction of arrow III of FIG. 2.

The circumferential widths of the first part 25a and the second part 25b of the cushioning plate 25 are L1 and L2 respectively, and the axial deviation between the parts is L3, all as illustrated in FIGS. 2 and 3.

In FIG. 2, a projection 35 protrudes integrally from the second part 25b of the cushioning plate 25 toward a clutch disc center. The projection 35 presses on an outer peripheral part of a back side of the clutch plate, i.e., an opposite side (back side of FIG. 2) of a face on which the cushioning plate fastening part 29 contacts against the clutch plate, thereby applying an elastic force to decrease the protuberance of the second part 25 which proturberates to the pressure plate side. Thus, a damping effect is brought about to the pressure plate side facing 28b which, otherwise, is apt to vibrate in the axial direction together with the pressure plate under the half-engaged state. The resonance phenomenon caused by the proturberating second part 25b is restricted even though the axial deviation L3 is provided in the cushioning plate 25.

The pressure plate 33 of FIG. 1 is connected through a strap (not shown) extending in the circumferential direction of the clutch to a clutch cover (not shown) fastened to the flywheel 32 so that pressure plate is supported in a manner to rock freely in the direction of clutch center axis. Further, a spring force, generated by a diaphragm spring (not shown), acts on the pressure plate 33 to press the facing 28 toward the flywheel 32. However, the pressure plate 33 is relieved from facing 28 to disengage the clutch by bending the diaphragm spring backward through means of a release lever interlocked to a clutch pedal.

Figure 4:
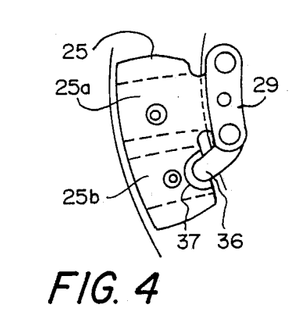
FIG. 4, FIG. 5 and FIG. 6, are views corresponding to respective parts of FIG. 2 for illustrating different embodiments.
Figure 5:
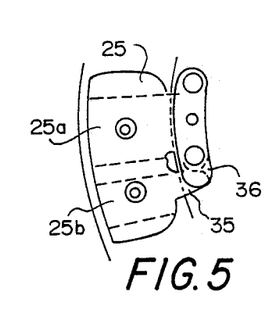

In embodiments 4 and 5, a tip end of a presser plate 36 tightened together with the cushioning plate fastening part 29 presses on a pressure plate side face of the second part 25 proturberating to the pressure plate side in a direction to decrease the protuberance.

Namely, 37 of FIG. 4 is a notch provided on the facing 28b exposing the second part 25b upon which the presser plate 36 presses. In order to have the presser plate 36 contact with the second part 25b, a friction area of the pressure plate side facing 28b will decrease by an area corresponding to the notch in this case.

The presser plate 36 of FIG. 5 presses on the projection 35 of the second part 25b in a direction to minimize the protuberance.

Figure 6:
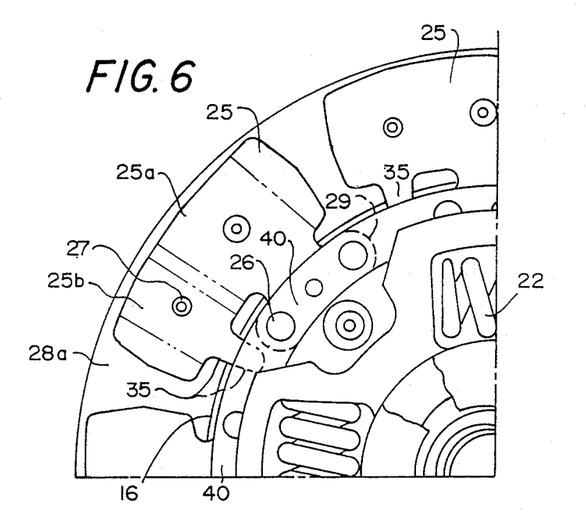

An embodiment of FIG. 6 is an example employing a ring-like presser plate 40 in place of the presser plate as illustrated in FIG. 4 and 5.

Figure 7:
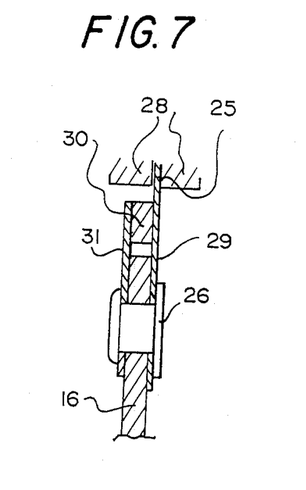
FIG. 7 and FIG. 8 are enlarged vertical sectional views corresponding to VII (and VIII) parts of FIG. 1 for illustrating further other embodiments.

In the embodiment of FIG. 7, a rubber damping member 30 contacts with a face opposite to the flange within an area of the fastening part 29 of the cushioning plate 25 at peripherally external side of the clutch plate 16 and internal side of the flange 28. A contact pressure of this case is as small as about 1 kg/cm², for example.

A side face of the damping member 30 opposite to the fastening part 29 is bonded to a clutch outer peripheral side face of a hold metal 31. An inner peripheral part of the hold metal 31 is fastened to the clutch plate 16 by the rivet 26 which fastens the fastening part 29, thereby the damping member 30 is held in a slightly compressed state between the fastening part 29 and the hold metal 31.

Figure 8:
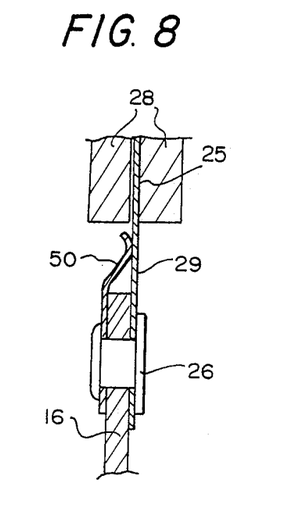

In the embodiment of FIG. 8, a plate-like damping member 50 contacts with a face opposite to the flange within an area of the fastening part 29 of the cushioning plate 25 at peripherally external side of the clutch plate 16 and internal side of the flange 25. An inner peripheral part of the damping member 50 is secured to the clutch plate 16 by the rivet 26 which fastens the fastening part 29. The damping member 50 is formed into an approximately S-shape as it leaves the rivet 26 to the clutch outer periphery. A contact pressure of the damping member 50, made of a weak spring steel, is as small as about 1 kg/cm², for example.

The operation will be described hereunder. In FIG. 1, when the pressure plate 33 presses the facing 28 against the flywheel 32, a torque from the flywheel 32 is transmitted through the facing 28, the cushioning plate 25, the clutch plate 16, the torsion spring 22, the flange 13 and the spline hub 11 to the not-shown output shaft. In this case, a torsion is produced between the both plates 16 and 17 and the flange 13 corresponding to the transmitted torque so that slippages are generated on surfaces of the friction members 14 and 15. The slippage produces a hysteresis torque which absorbs torque fluctuation. On the other hand, vibrations, originated from various causes, occur in the flywheel 32. These vibrations are transmitted to the facing 28 and further also to the pressure plate 33, mainly through the facing 28. In the structures, as illustrated in FIG. 1 through FIG. 3, the projection 35 of the second part 25b of the cushioning plate 25, proturberating to the pressure plate side, presses on the back side of the clutch plate 16 to apply a force in a direction to decrease the protuberance. Vibrations of the pressure plate 33 etc., based on the deviation L3, can be controlled at the time of half-engaged state when the axial deviation L3 is not completely flattened. Thus, the "resonance sound", at the time of starting a vehicle, can be avoided.

When the structure of FIG. 4, FIG. 5 or FIG. 6 is employed, the presser plates 36 and 40 press on the second part 25b in the direction to decrease the protuberance so that the same effect may be obtainable, that is, the vibrations of the facing 28 and the pressure plate 33 can be controlled, and the "resonance sound" of clutch can be minimized.

Moreover, when the structure of FIG. 7 and FIG. 8 is employed, the resonance of the cushioning plate 25 can be controlled to decrease the "resonance sound" of clutch.

Figure 9:
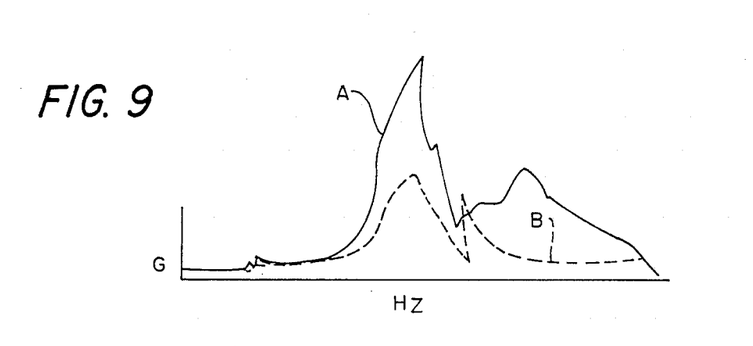
FIG. 9 is a graph showing a relation between frequency and acceleration.

FIG. 9 shows the results of vibration test. In FIG. 9, the axis of abscissa represents a clutch axial frequency Hz applied on the flywheel 32 and the axis of ordinate represents an acceleration G of the pressure plate 33 generated in resonance with the axis of abscissa.

As obvious from FIG. 9, the acceleration of the pressure plate 33 is particularly decreased in the characteristic B obtained from the structures of FIG. 1 through FIG. 3 as compared with the characteristic A obtained from the conventional structure. Thus, the "resonance sound" of clutch can be minimized.

As shown in FIG. 5, the portion 25b of cushioning plate 25, which rising toward the pressure plate 33, FIG. 1 (this side of FIG. 5) is provided with the projection 35 projecting toward the clutch disc side. Projection 35 meshes with the backside face of the clutch plate 16 to apply initial load to the second portion 25b to minimize its deflection. In FIG. 4, the tip end of pressure plate 36 is fastened together with the cushioning plate fastening portion 29. The portion 29 presses on the surface of the pressure plate side of second portion 25b to apply initial load in the direction to minimize the deflection of second portion 25b. Notch 37 of FIG. 4 is provided on facing 28b to expose second portion 25b on which pressure plate 36 presses.

Figure 16:
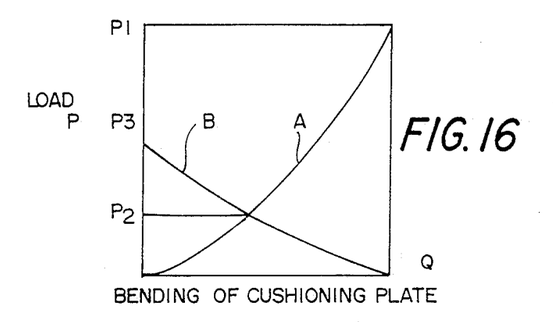
FIG. 16 is a graph showing a relation between load and deflection.

As shown by solid line B of FIG. 16, the structures of foregoing FIGS. 4 and 5 have the advantage that a desired load can be obtained not only in the initial state, but also in the half-engaged state represented by P2.

However, the above-mentioned structures have the disadvantage that the resonance sound of clutch can not completely be reduced because acceleration G, caused by resonance of the pressure plate (FIG. 1) at the beginning of starting the vehicle does not decrease as shown by a solid line D of FIG. 17 or FIG. 18 described later in details.

The present invention foregoing problem is solved in the following embodiments by using a structure wherein a load P is increased with an increase in the bending Q of the rising second portion, as shown by the solid line A of FIG. 16 and provides a structure producing less sound, as shown by a broken line F of FIG. 18, regardless of a large load characteristic at the initial state.

In the following embodiments, the damping member forms a pressure piece which extends from the fastening portion of the cushioning plate adjacent to the rising second portion toward the projection and presses on an opposite surface to the clutch plate side of the projecting so as to apply a pressing force on the rising second portion.

Further, in a clutch disc wherein a first portion flush with a fastening part with a clutch plate or deviated to a flywheel side and a second portion rising toward a pressure plate from the first portion are provided on a cushioning plate which connects the output side disc-like clutch plate to an input side facing at its outer peripheral side. Friction facings are secured to the flywheel side of the first portion and the pressure plate side of the second portion. A projection is provided which extends form the rising second portion of the cushioning plate to a central side of the clutch disc. A damping member is provided which presses on the projection to control a resonance sound of the clutch disc. The damping member forms a surface at the pressure plate side of the clutch plate, which is faced to or contacted with the projection to increase the load with an increase in the deflection of the rising second portion.

According to the structure of the following embodiment, a torque transmitted to the friction facings from the engine side flywheel is transmitted through the cushioning plate to the output side clutch plate. At the same time, vibrations due to various factors are transmitted to the friction facings from the flywheel side. These vibrations are transmitted also to the cushioning plate. However, resonance of the cushioning plate is controlled by the damping member to minimize the generation of resonance sound in the so-called half-engaged state.

Figure 10:
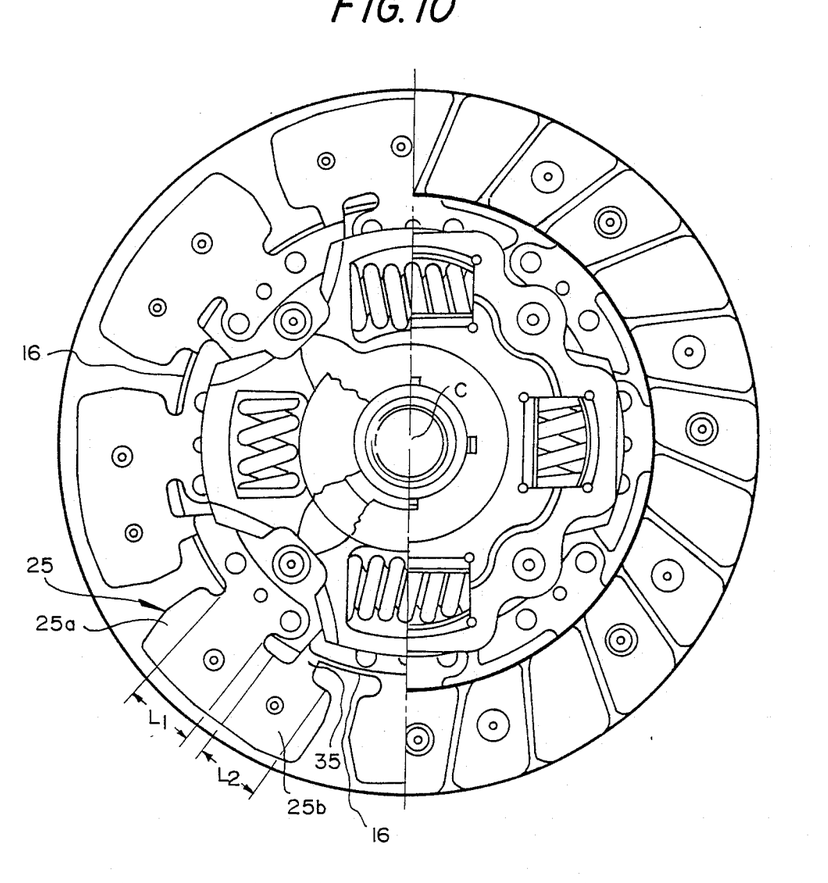
FIG. 10 is a view similar to FIG. 2 but showing a still further embodiment of the invention.
Figures 11, 12:
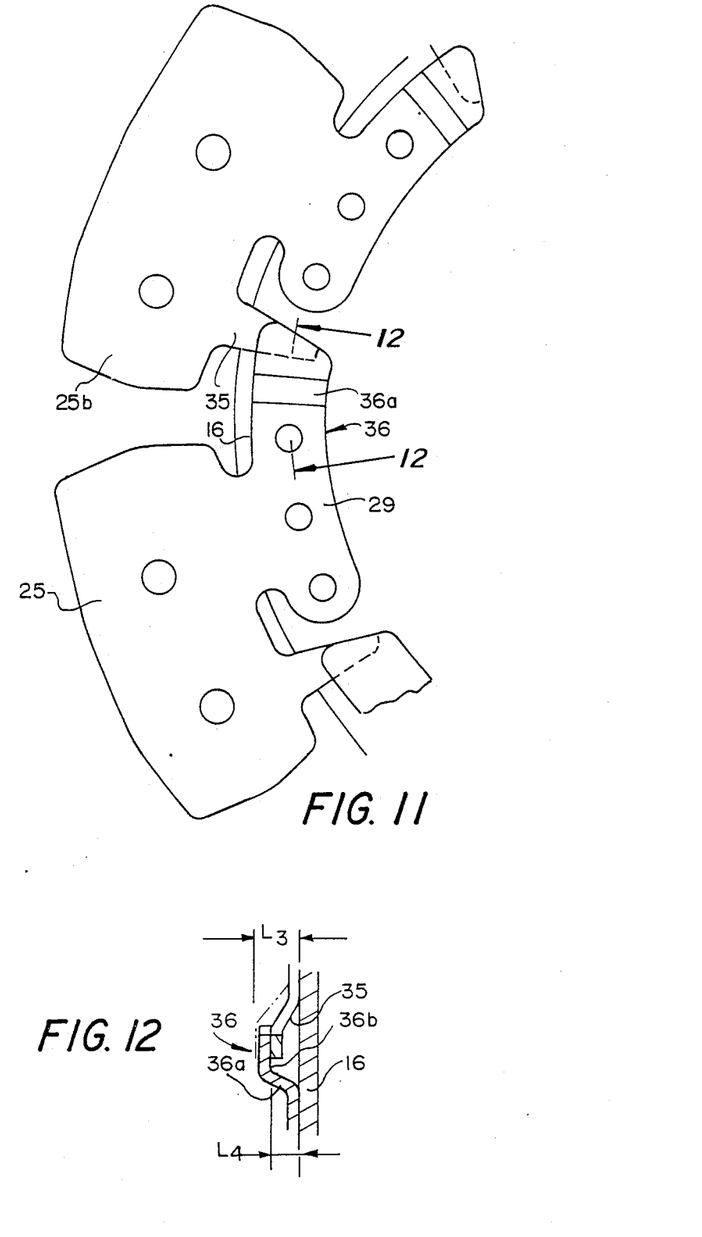
FIG. 11 is a view similar to FIGS. 4, 5 and 6 but showing the embodiment of FIG. 10.
FIG. 12 is a view similar to FIG. 3 but showing the embodiment of FIGS. 10 and 11.

Circumferential widths of the first portion 25a and the second portion 25b of the cushioning plate 25 of the following embodiments are L1 and L2 (FIG. 10) respectively, and a deviation between the both in their axial direction is L3 of FIG. 12. A still further embodiment described later employs the same construction.

In the embodiment illustrated in FIG. 10 through FIG. 12, a projection 35 (damping member) projects integrally from the second portion 25b of the cushioning plate 25 toward the clutch disc center line C as illustrated in FIGS. 10 and 11. This projection 35 presses on a clutch plate 16 side surface 36b (FIG. 12) of a pressure piece 36 of the cushioning plate 25 adjacent to the rising second portion 25b as illustrated in FIG. 11. The pressure piece 36 is formed integrally with a fastening portion 29 of the cushioning plate 25 and deviated by a distance L4 from the clutch plate 16 through a midway stepped portion 36a as illustrated in FIG. 12.

Further, L3 represents a deviation of the rising second portion 25b (FIG. 11) from the clutch plate 16. As illustrated in FIG. 12, the deviation L4 of the pressure piece 36 from the clutch plate 16 is set smaller than the deviation L3. Consequently, the pressure plate 36 presses down the projection 35 toward the clutch plate 16, thereby applying a resilient force in a direction to reduce the rising part of the second portion 25b rising toward the pressure plate 33. Namely, a damping action is exerted on the pressure plate side facing 28b which is apt to vibrate together with the pressure plate in its axial direction at the time of half-engaged state, so that a resonance phenomenon due to the second portion 25b can be controlled even though the axial deviation L3 is provided to the cushioning plate 25.

Function will be described hereunder. In FIG. 1, when the pressure plate 33 presses the facing 28 onto the flywheel 32, a torque from the flywheel 32 is transmitted to the not-shown output shaft through the facing 28, the cushioning plate 25, the clutch plate 16, the torsion spring 22, the flange 14 and the spline hub 11. In this instance, a torsion is produced between the plates 16 and 17 and the flange 13 correspondingly to the transmission torque so that surfaces of the friction members 14 and 15 slide. This slippage produces a hysteresis torque to absorb a torque fluctuation. On the other hand, vibrations due to various factors are generated in the flywheel 32. These vibrations are transmitted to the facing 28 and further to the pressure plate 33 mainly through the facing 28. According to the structure of the embodiment of FIGS. 11 and 12, however, the rising second portion 25b of the cushioning plate 25 is provided with the projecting 35 projecting therefrom toward the clutch disc central side. The pressure piece 36 extending toward projection 35 from the fastening portion 29 of the cushioning plate 25 adjacent to protruding second portion 25b is provided integrally, and the clutch plate 16 side surface 36 of the pressure piece 36 presses on the projection 35 so as to apply pressing force on the protruding second portion, as shown by FIG. 11. Therefore, in the half-engaged state where the axial deviation L3, FIG. 12, is not completely flattened, vibrations of the pressure plate 33 due to the deviation L3 can be controlled so that the resonance sound (abnormal sound) at the time of starting a vehicle can be avoided.

Figure 13:
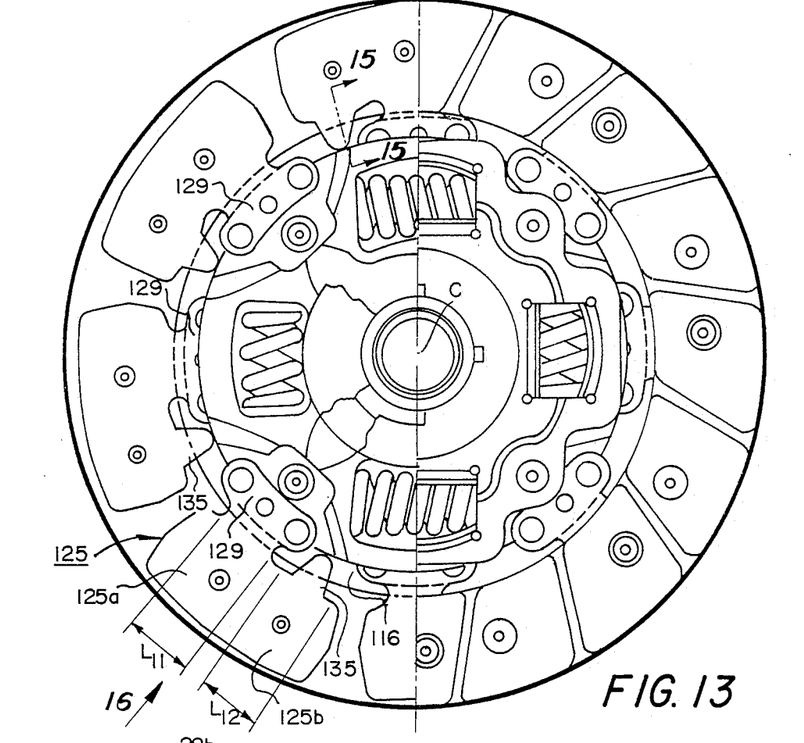
FIG. 13 is a partially cut-away front view of still another embodiment.
Figures 14, 15:
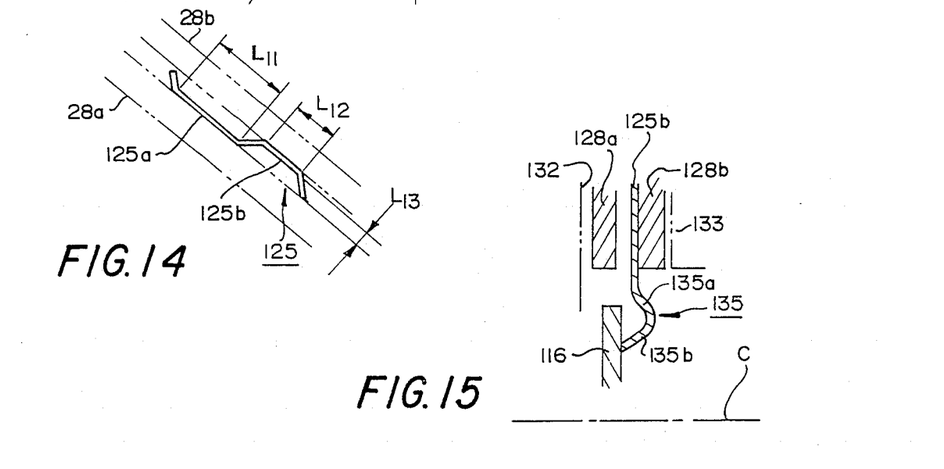
FIG. 14 is a view in the direction of arrow XIV—XIV of FIG. 13.
FIG. 15 is a sectional view taken on lines XV—XV of FIG. 13.

In the embodiment of FIGS. 13-15, a projection 135 projects integrally from a second portion 125b of cushioning plate 125 toward a clutch disc center line C. As the projection 135 goes from the rising second portion 125b side to the clutch disc center C side, a base portion 125b, FIG. 15, stretches at an initial stage toward pressure plate 33, and then a tip end portion 135b is bent or curved toward clutch plate 116 to press on a surface at the pressure plate 133 side of the clutch plate 116, as illustrated in FIG. 15. Thereby, a resilient force is applied on the second portion 125b, which rises toward the pressure plate 133, in a direction to increase its rising part. Namely, when the pressure plate 133 pushes pressure plate 133 side facing 128b toward a flywheel 132, at the time of clutch engagement, the projection 135 is held by the clutch plate 116 to withstand against a deformation of the rising second portion 125b of the cushioning plate 125. Thus, rigidity of the second portion 125b is increased and damping action is exerted on the facing 128b. Consequently, the resonance phenomenon, due to the rising second portion 125b, can be controlled even though an axial deviation L13 (FIG. 14) is provided in the cushioning plate 125.

Figure 17:
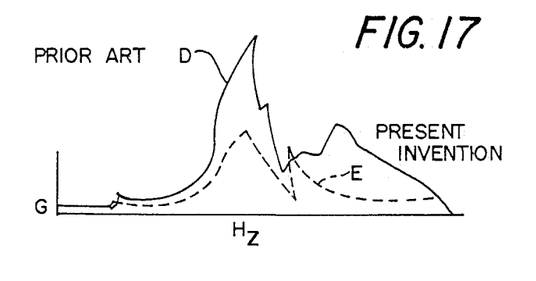
FIGS. 17 and 18 are graphs showing a relationship between frequency and acceleration.
Figure 18:
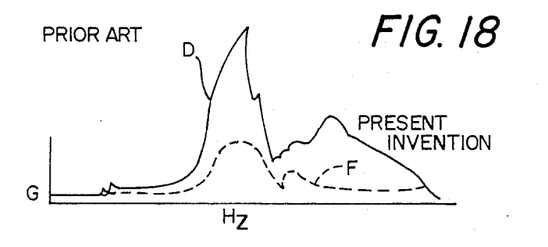

Results of vibration test obtained from the embodiments of FIGS. 10–12 and FIGS. 13–15, are shown in FIG. 17 and FIG. 18, respectively. In FIG. 17, and FIG. 18, the axis of abscissa represents a frequency Hz applied on the flywheel 32, FIG. 1, in the direction of clutch disc center, and the axis of ordinate represents an acceleration G of the pressure plate 33 generated from resonance. As seen from FIG. 17 and FIG. 18, the acceleration of the pressure plate 33 (FIG. 1) can be minimized extremely in the characteristic E (embodiment of FIGS. 10–12) or the characteristic F (embodiment of FIGS. 13–17), so that the resonance can be reduced, as compared with the characteristic D of the conventional structure.

According to the embodiments of FIGS. 10–12 and 13–17, when the clutch is in the half-engaged state, which occurs at the time of starting a vehicle, due to the axial deviation L13, FIG. 12 or L13, FIG. 14, provided for the purpose of exerting the spring action on the cushioning plate 25 or 125, the resonance phenomenon wherein both the pressure plate 33 and the pressure plate side facing 28b or 128b vibrate in the axial direction, can be controlled effectively by the projection 35 or 135 so that the generation of resonance sound can be avoided.

What is claimed is:

1. A clutch disc for use between a flywheel and a pressure plate, said clutch disc having a clutch plate, a cushioning plate connected to said clutch plate and friction facings connected to the opposite sides of said cushioning plate, said cushioning plate having a first part flush with said clutch plate at the flywheel side of said clutch disc and a second part protruding away from said first part toward a pressure plate side of said clutch disc, said friction facing at the flywheel side of said cushioning plate being fastened to the flywheel side of said first part and said friction facings at the pressure plate side of said cushioning plate being fastened to the pressure plate side of said second part of said cushioning plate and a damping member positioned between said cushioning plate and said clutch plate for damping vibrations of said clutch disc in an axial direction of said cushioning plate.

2. A clutch disc as set forth in claim 1, in which said damping member presses on and depresses said protruding second part of said cushioning plate.

3. A clutch disc as set forth in claim 2, in which a projection projecting from said protruding second part toward a clutch disc center axis, said projection being engaged with said clutch plate so as to depress said protruding second part.

4. A clutch disc as set forth in claim 2, in which said damping member includes a presser plate having a tip end contacted against said protruding part so as to depress said protruding second part.

5. A clutch disc as set forth in claim 2, in which said damping member includes a projection projecting from said protruding second part toward said clutch disc center axis, and a presser plate having a tip end secured together with said cushioning plate fastening part contacting against said projection and depressing said protruding second part.

6. A clutch disc as set forth in claim 1, in which said damping member is contacted against said cushioning plate second part within an area peripherally external from said clutch plate and internal from said friction facing, said damping member having a base portion secured to said clutch plate.

7. A clutch disc as set forth in claim 6, in which a rubber damping member is bonded to a hold metal and said hold metal is secured to said clutch plate.

8. A clutch disc as set forth in claim 6, in which a plate-like member formed into an S-shape and serving as the damping member is secured to said clutch plate.

9. A clutch disc, as recited in claim 1, in which a projection extends integrally from said second part of said cushioning plate and protrudes toward said pressure plate side of said clutch disc, said damping member pressing on said projection extending from said second part of said cushioning plate, for controlling resonance sound of said clutch disc and forming a pressure piece extending integrally from said cushioning plate adjacent to said second part of said cushioning plate toward said projection and pressing on a surface of said projection opposite to a clutch plate side of said projection and applying a pressing force on said second part of said cushioning plate.

10. A clutch disc, as set forth in claim 9, in which said pressure piece extending integrally from said cushioning plate is biased through a stepped portion toward said pressure plate, said biasing being smaller than said protruding of said second part of said cushioning plate away from said first part of said cushioning plate.

11. A clutch disc for use between a flywheel and a pressure plate, said clutch disc having a clutch plate, a cushioning plate connected to said clutch plate and having a first part and a second part, said second part being biased toward said pressure plate from said first part, friction facings secured to a flywheel side of said first part and friction facings secured to a pressure plate side of said second part, a projection extending integrally from said biased second part of said cushioning plate and projecting to a central side of the clutch plate, and a damping member for pressing on said projection for controlling resonance sound of the clutch disc; a damping mechanism for said clutch disc formed on a surface of the pressure plate side of said clutch plate and facing to or contacting with said projection for increasing the load on said projection with an increase in the deflection of said biased second part of said cushioning plate.

* * * * *